Feb. 21, 1956     T. N. CHRISTIANSEN     2,735,207

AUTOMATIC FISHING APPARATUS

Filed Dec. 15, 1953     2 Sheets-Sheet 1

Feb. 21, 1956     T. N. CHRISTIANSEN     2,735,207
AUTOMATIC FISHING APPARATUS

Filed Dec. 15, 1953     2 Sheets-Sheet 2

United States Patent Office 2,735,207
Patented Feb. 21, 1956

2,735,207

AUTOMATIC FISHING APPARATUS

Thorbjörn N. Christiansen, Nyksund, Vesteralen, Norway

Application December 15, 1953, Serial No. 398,404

9 Claims. (Cl. 43—15)

The present invention relates to an automatic fishing apparatus especially usable in jigging, and the object of the invention is to provide a fishing apparatus having a line drum which may be connected to a driving device in such a manner that the line may run freely out to the desired depth at which point a jigging movement is imparted to said line. When a fish bites the line is automatically wound up on the drum until the fish is at the sea level at which time the drum stops. After the free running of the line it is wound up at an even or varying speed, until the sink is at the sea level. An important feature of the invention is that the shaft of the line drum is operatively connected to a control member which may be adjusted to act upon a regulating member coupled in the driving device when the drum has effected a predetermined number of revolutions.

An embodiment of the invention is, as an example, illustrated in the drawing in which.

Figure 1:
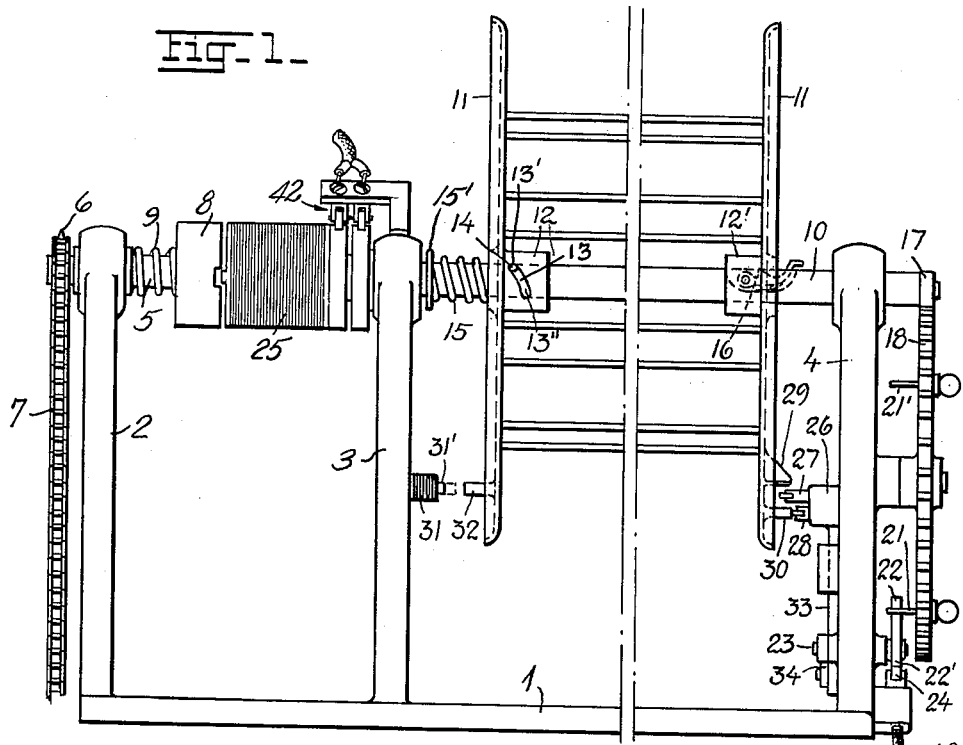
Figure 1 shows a front view of the apparatus.

In the drawing 1 denotes a base having three bearing brackets 2, 3 and 4, the bearings of which are lying on a common axis. In the bracket 2 a shaft 5 is rotatably supported having at one end a sprocket 6 for a chain 7 leading to a driving sprocket on a suitable driving shaft (not shown). On the other end of said shaft 5 a coupling member 8 is mounted slideably against the action of a spring 9, but not rotatably.

A shaft 10 is rotatably supported in the bearing brackets 3 and 4 on which is mounted a line drum 11 by means of bosses 12 and 12' having a rotatable fit on said shaft 10. The line drum 11 has wound about it a line 11'. The boss 12 at the left hand end of the drum 11, is provided with a slit 13, oblique with respect to a cross plane through said drum and extending over a certain portion of the circumference of said boss. The slit 13 receives a tap 14 protruding radially from the shaft 10 and resting normally against the end 13' of said slit 13 lying nearest the adjacent end of the drum 11. By this arrangement the tap 14, when the drum 11 is rotated relatively to the shaft 10 in clockwise direction, as viewed from the right in Figure 1, displaces the drum 11 a certain distance to the left on the shaft 10 until the tap 14 abuts the other end 13" of said slit 13.

In order to restrain said displacement and to return the drum 11 to normal position in which the tap 14 rests against the end 13' of the slit 13, a compressing spring 15 is mounted on the shaft 10 between the outer end of boss 12 and a ring 15' preferably adjustably secured on the shaft 10.

In order to automatically lock the drum in displaced position with said tap 14 resting against the end 13" in said slit 13, the shaft 10 in the portion thereof received in the bore of the boss 12' is provided with an axially extending groove 35 receiving a pawl 16 swingably secure on a pivot 36 and provided with a nose 37. Interposed between the pawl and the bottom of said groove is a spring 38 tending to swing said pawl outwardly from the axis of the shaft 10. In normal position of the drum 11, that is the position shown in Figure 1, the nose 37 of the pawl 16 lies within the bore of the boss 12' resting against the wall thereof. When, however, the drum is displaced in the manner described above, the tap 14 comes into contact with the end 13" of the slit 13, the outer end surface of the boss 12' is passed beyond the nose 37 so that it, by the action of the spring 38, is brought in to engagement with said end surface and retains the drum 11 in displaced position. The pawl is provided with an extension 39 by means of which the pawl may be pressed into the groove 35 in order to release the drum which by means of the spring 15 is returned to normal position.

A pinion 17 co-operating with a spur gear 18 rotatably secured on a pivot 19 on the bearing bracket 4 is secured at the right hand end of shaft 10. The gear ratio between the wheels 17, 18 is so selected that the spur gear 18 makes appproximately one revolution while the pinion makes one hundred revolutions. In order to reduce the dimensions as much as possible the pinion 17 may have only one tooth so that the spur gear 18 is moved one tooth by each revolution of the shaft 10.

The spur gear 18 has a circular row of evenly distributed holes 20 which, according to choice, a stop 21 may be inserted. This stop protrudes at the inner side of the wheel as shown. The distance between the holes 20 is so adapted with respect to the effective diameter of the drum 11 and the gear ratio between the wheels 17 and 18 that it represents a certain length of line, such as one yard, and the holes are correspondingly numbered consecutively from zero as shown. In the hole at zero is inserted a stop 21' corresponding to the stop 21.

The stops serve to operate a breaker lever 22 which is rotatably supported in the bearing bracket 4 by means of a shaft 23. The lever 22 is at the opposite side of the shaft 23 provided with a wedgeshaped nose 22' coacting with a spring loaded roll 24 so that when the lever 22 during tilting from one position to the other acts as a circuit breaker. The lever 22 serves to break and close an electric circuit and may for that purpose be provided with sliding contacts for co-operation with suitable contact segments or rails or may operate a separate breaker for the purpose mentioned. The driving circuit controls an electromagnetic coupling or clutch 25 secured on the shaft 10 and co-operating with the coupling member 8 on the driving shaft 5 so that when the coupling 25 is energized it attracts the coupling member 8 against the action of the spring 9 and connects the shafts 5 and 10, and when the coupling is deenergized said shafts are again released from each other. The coil of the coupling 25 may be supplied with current by means of suitable sliding contacts or be mounted stationary about a rotating core secured on the shaft 10. As will be understood any type of electrically operated coupling or clutch may be used and that illustrated is only shown as an example.

At the inner side of the bearing bracket 4 is arranged a double press-button switch 26 coupled into the circuit of the driving current and the press buttons 27 and 28 thereof, being provided with rolls, cooperate with cam protrusions 29, 30 respectively, preferably adjustably secured on the end face of the drum 11.

Figure 4:
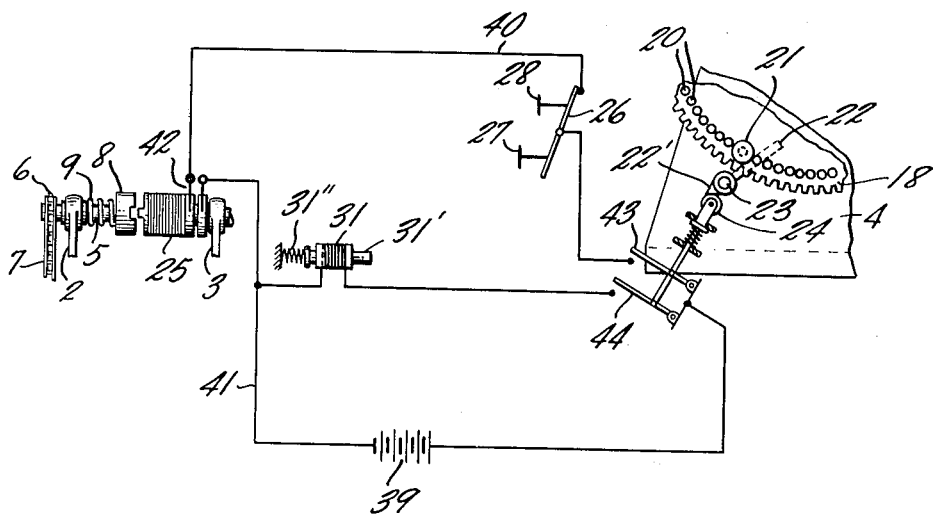
Fig. 4 is a diagram of the electric circuit for operating the apparatus.

Figure 4 shows a circuit diagram in which a source 39 of electric power by means of conductors 40 and 41 is connected with sliding contacts supplying current to the magnetic clutch 25. A main switch 43 operated by lever 22 and the press-button switch 26 is coupled in the conductor 40. The lever 22 also operates a switch 44 controlling the current supply to the solenoid 31.

The apparatus operates in the following manner.

The chain 7 may be driven from a continuously rotating shaft, which may be common for a number of apparatuses, while current is supplied from a generator or another suitable source.

Figure 2:
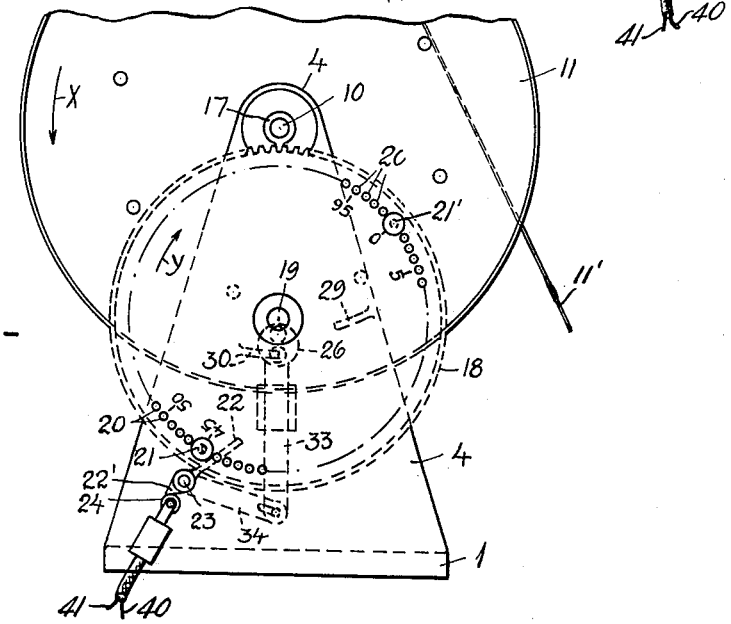
Figure 2 is an end view thereof.
Figure 3:
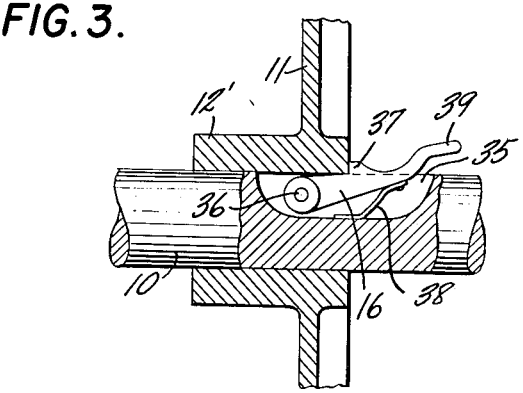
Fig. 3 is an axial section through the boss and shaft of the apparatus with the pawl in locking position.

Assuming that it is desired to fish at a depth of 45 yards, the stop 21 is inserted in the hole 20 of the wheel 18 corresponding to said depth as shown. The drum 11 is now located in the right end position with the pawl 16 released. When the jig or sink is thrown over board it sinks and thereby the line 11' runs off the drum 11, which rotates freely in the opposite direction of that shown by the arrow X in Figure 2. When the predetermined length of the line has run out the stop 21 engages the breaker lever 22 and tilts the same to the position shown in Figure 2. Thereby the driving circuit is closed and energizes the coupling 25 so that the drum 11 commences to rotate in the opposite direction. During this operation the cam 29 acts upon the press-button 27, the current is switched off, the sink draws the drum backwards until the cam 30 acts upon press-button 28 at which time the current is again switched on and the same operation is repeated. Due to this manipulation the jig receives jigging or snatching movements in a length corresponding approximately to the circumference of the drum.

At this point, if a fish takes the jig the press-button 28 is pressed in and the current closes, thereby decreasing to such a degree that the action of the spring 15 is overcome and a relative movement between the shaft 10 and the drum arises, whereby the drum, owing to the slit 13, moves to the left (Figure 1) on the shaft until the pawl 16 releases and engages the end of the boss 12' so that the drum 11 is retained in its displaced position. The cams 29 and 30 carried by the drum are thus moved to the left so that they cannot act on the switch 26, but as the displacement of the drum 11 may be effected only during the winding up movement, the switch 26 is in current closing position so that the winding up continues movement.

During this operation the jig with the fish arrives at the sea level, the shaft of the drum has rotated the wheel 18 in the direction of the arrow y (Fig. 2) backwards so that the stop 21' placed at zero, returns the breaker lever 22 to the starting position whereby the current switches off, whereafter the fish may be taken off, the pawl 16 pressed down so that the drum 11 displaces to the starting position, and the jig again thrown out whereby a similar cycle is repeated.

In order that the fish, when the drum 11 after the hauling in is released, shall not be able to swim towards the bottom and thereby draw out the line, a braking or stopping device may be provided which comes into operation when the drive is disconnected after the hauling in has been finished. Said device as an example may consist in a solenoid 31 which is coupled into the driving circuit and in energized condition holds its armature 31' retracted against the action of a spring 31. When in this case the current is switched off at the end of the hauling in, the armature is released and moved forwards by said spring so that it serves as a stop for a protrusion 32 on the drum 11 and prevents the drum from rotating. The armature 31' and the protrusion 32 are so arranged in relation to each other that they only may co-operate when the drum has been displaced on the shaft 10 and are therefore not operative by interruption of the current during the jigging movement of the drum.

In order that the cams 29 and 30, during running out of the line when the drum rotates freely, shall not act upon the switch 26, it may be arranged on a rod 33 pivotally supported by the free end of a lever 34 secured on the shaft 23 so that when said lever 22 is in the switching off position the switch 26 has been moved upwardly out of the operative range of the cams 29 and 30 and is returned to co-operation therewith at the same time as the breaker lever 22 switches in the current.

When it is desired to haul in the jig immediately after it has reached a predetermined depth, the operation is as described above, the switch 26 being disconnected so that the jigging movement does not take place. In this operation if it is desired to impart a periodic speed variation to the jig while it is being hauled in, the line supporting portion of the drum is adjusted in relation to the end flanges or discs so that it is positioned eccentrically relative to the shaft 10.

What I claim and desire to secure by Letters Patent is:

1. In an automatic fishing apparatus the combination of a base structure, a drum shaft rotatably supported in said base, a line drum on said shaft, a fishing line wound about said drum, a continuously rotating driving shaft, a drive gear including a clutch interconnecting said shafts, spring means tending to disengage said clutch, operating means for engaging said clutch against the action of said spring means, and control means operated by said drum shaft when rotated during rewinding of the line thereon by its own weight and adjustable to act upon said operating means, to engage said clutch when said drum shaft has effected a predetermined number of revolutions, so as to rotate said drum shaft in reversed direction.

2. An automatic fishing apparatus as claimed in claim 1, in which said control means is provided with releasing means operative to disconnect said clutch when said drum shaft has effected a number of revolutions in said reversed direction equal to the number of revolutions made by rewinding said line.

3. In an automatic fishing apparatus the combination of a base structure, a drum shaft rotatably supported in said base, a line drum on said shaft, a fishing line wound about said drum, a continuously rotating driving shaft, mounted in alignment with said drum shaft, a clutch connecting the adjacent ends of said shafts, spring means tending to retain said clutch in disengaged position, electrically driven operating means for engaging said clutch against the action of said spring means, control means operated by said drum shaft when rotated during rewinding of the line thereon by its own weight and adjustable to act upon said operating means to engage said clutch when said drum shaft has effected a predetermined number of revolutions so as to rotate said drum shaft in reversed direction.

4. An apparatus as claimed in claim 3 in which said operating means is an electromagnet of an electric clutch connecting the adjacent ends of said drum shaft and driving shaft.

5. An apparatus as claimed in claim 3 in which said control means comprise a main switch in said electrically driven operating means, a rotatably mounted member, means for driving said member from the drum shaft at reduced speed, adjustable stops on said member co-operating with said main switch in the circuit of said electrically driven operating means.

6. An apparatus as claimed in claim 3 which includes, a drum shaft, a line drum mounted on said shaft for combined rotatable and axial movement thereon against the action of a spring device, a pin protruding radially from said shaft being received in a screw line shaped slit in said drum limiting said combined movement, and releasable locking means on said shaft operating to automatically retain said drum in moved position.

7. An apparatus as claimed in claim 3 which includes, control means comprising a rotatably mounted member, electrically driven blocking means, a main switch in said electrically driven operating means, means for driving said member in response to said drum shaft at reduced rotation speed, said member having a circular row of holes therein, pins inserted in desired holes of said row forming stops for cooperating with a main switch in the circuit of said electrically driven operating means, and a further switch combined with said main switch and effective to control said electrically driven blocking means for said drum so that said blocking means is rendered operative when said main switch is opened.

8. An apparatus as claimed in claim 6 in which said line drum is provided with cams and a switch adapted to be actuated thereby in the circuit of said electrically driven operating means, one of said cams, when said drum has been rotated in said reversed direction approximately one revolution operates said switch to break said circuit and disengage said clutch permitting said drum to be rotated in rewinding direction by the action of the weight of the fishing line approximately one turn at the end of which the other cam operates said switch to close said circuit, this cycle being constantly repeated until a fish takes the bait and exerts an additional pull on the line whereby said drum is moved relatively said drum shaft against the action of said spring device and is locked in displaced position with the cams removed from co-operation with said switch leaving same in circuit closing position.

9. An apparatus as claimed in claim 8 in which said switch is mounted displaceably at right angles to the axis of said drum, and includes means connecting said switch to the main switch so that said switch moves out of the path of said cams when the main switch is operated to open position.

References Cited in the file of this patent

UNITED STATES PATENTS

| | | |
|---|---|---|
| 202,962 | Robertson | Apr. 30, 1878 |
| 1,524,011 | Ballew | Jan. 27, 1925 |
| 2,194,088 | Joabson | Mar. 19, 1940 |
| 2,643,478 | Paulsen | June 30, 1953 |

OTHER REFERENCES

Register over Norske Patenter: (1952) Norske Tidende for det Industrielle Rettsvern: Jan. 5, 1953, May 18, 1954.